United States Patent
Kajikawa

(10) Patent No.: US 9,388,857 B2
(45) Date of Patent: Jul. 12, 2016

(54) CAGE OF ROLLER BEARING AND ROLLER BEARING STRUCTURE

(71) Applicant: NTN CORPORATION, Osaka (JP)

(72) Inventor: Shuichi Kajikawa, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/386,058

(22) PCT Filed: Feb. 25, 2013

(86) PCT No.: PCT/JP2013/054687
§ 371 (c)(1),
(2) Date: Sep. 18, 2014

(87) PCT Pub. No.: WO2013/140948
PCT Pub. Date: Sep. 26, 2013

(65) Prior Publication Data
US 2015/0043862 A1    Feb. 12, 2015

(30) Foreign Application Priority Data
Mar. 23, 2012   (JP) .................................. 2012-067337

(51) Int. Cl.
*F16C 33/46*  (2006.01)
*F16C 19/26*  (2006.01)

(52) U.S. Cl.
CPC ............. *F16C 33/4605* (2013.01); *F16C 19/26* (2013.01); *F16C 33/467* (2013.01); *F16C 33/4676* (2013.01)

(58) Field of Classification Search
CPC .................................................. F16C 33/4676
See application file for complete search history.

(56) References Cited

U.S. PATENT DOCUMENTS

| | | | | |
|---|---|---|---|---|
| 2,883,245 A | * | 4/1959 | Anderson | F16C 33/4647 384/578 |
| 4,472,006 A | * | 9/1984 | Goransson | F16C 23/086 384/576 |
| 4,702,628 A | * | 10/1987 | Watanabe | F16C 33/4635 384/580 |
| 5,172,986 A | * | 12/1992 | Yokota | F16C 19/463 29/898.067 |
| 5,803,620 A | * | 9/1998 | Yokota | F16C 19/46 384/580 |
| 6,367,983 B1 | * | 4/2002 | Muntnich | F16C 19/44 29/898.067 |
| 2005/0069239 A1 | * | 3/2005 | Yamamoto | F16C 19/28 384/572 |

FOREIGN PATENT DOCUMENTS

| | | |
|---|---|---|
| JP | 07-103240 | 4/1995 |
| JP | 2000-145790 | 5/2000 |

(Continued)

*Primary Examiner* — Thomas R. Hannon
(74) *Attorney, Agent, or Firm* — Clark & Brody

(57) ABSTRACT

A pillar includes a radially outer projection that is formed at the radially outer side of a pillar's wall surface facing a pocket so as to project in the circumference direction and restricts radially outward movement of a roller. A radially inner projection is formed at the radially inner side of the pillar's wall surface facing the pocket so as to project in the circumference direction and restrict radially inward movement of the roller. Allowable distance Lo to which the roller can move radially outward from a pitch circle PCD of the rollers under the restriction of the radially outer projections and allowable distance Li to which the roller can move radially inward from the pitch circle PCD of the rollers under the restriction of the radially inner projections satisfy the relationship Lo>Li. The cage solves the problem that the rollers get caught by the roller retaining elongated projections.

4 Claims, 8 Drawing Sheets

(56) References Cited

FOREIGN PATENT DOCUMENTS

| JP | 2000-205271 | 7/2000 | |
| JP | 2005-140269 | 6/2005 | |
| JP | 2006-242284 | 9/2006 | |
| JP | 3926865 B2 * | 6/2007 | .......... F16C 33/4676 |

* cited by examiner

CAGE OF ROLLER BEARING AND ROLLER BEARING STRUCTURE

TECHNICAL FIELD

This invention relates to a cage having a plurality of pockets for accommodating rollers.

BACKGROUND ART

Roller bearings, such as cylindrical roller bearings and needle roller bearings, include a plurality of rollers rolling between an outer raceway and an inner raceway and a cage for retaining these rollers at regular intervals in the circumferential direction. In manufacture of a cage which is used in a roller-and-cage assembly and holds rollers in pockets individually, forcible removal of a molding die from the pockets causes burrs to occur and therefore cage deformation and some other defects may take place. To solve the problem, the applicant of this application has already proposed a technique described in Japanese Unexamined Patent Publication No. 2000-145790 (PTL 1).

The technique in PTL 1 relates to a needle roller-and-cage assembly, and the cage thereof has roller retaining elongated projections formed on wall surfaces of pillars of the cage so as to extend in the axial direction, the wall surfaces facing pockets. The elongated projections are arranged on both the radially outer and inner sides of the cage to prevent the rollers from dropping out. Among these elongated projections, radially outer retaining elongated projections arranged on the outer side of the cage have ends rounded into an arc shape in cross section, and the radius of the arc-shaped ends is set to be 0.5 times greater than the height of the radially outer retaining elongated projections, but 1.5 times shorter than the height. In addition, limiting the angle range of an inner inclined surface of the radially outer retaining elongated projections within 15° to 25° can contribute to both easy forcible removal and roller dropout prevention effect. Furthermore, in assembly operation of the roller-and-cage assembly, the rollers can be easily inserted into the pockets from the radially outside of the cage.

CITATION LIST

Patent Literature

PTL1: Japanese Unexamined Patent Publication No. 2000-145790

SUMMARY OF INVENTION

Technical Problem

However, the inventors of this invention have discovered that the aforementioned conventional cages still need to be improved. That is, the smaller the angle of the inner inclined surface of the radially outer retaining elongated projections, the likelier it becomes that the rollers are caught between the pairs of the radially outer retaining elongated projections facing each other with a pocket therebetween, thereby possibly obstruct smooth rotation of the rollers.

FIG. 12 is a transverse sectional view of a typical roller-and-cage assembly, especially showing an enlarged view of a roller accommodated in a pocket. As shown in FIG. 12, the roller-and-cage assembly is placed in an annular space defined by an outer raceway 131 and an inner raceway 132. When a cage 111 is moved off center from its neutral position in the direction indicated by an arrow, the rolling surface of a roller 121 makes contact with radially outer retaining elongated projections 115. As a result, the roller 121 is caught by the pair of the radially outer retaining elongated projections 115, 115. Thus, the roller 121 fits, like a wedge, in between the pair of the inner inclined surfaces 115i, which are formed on the radially inner side of the radially outer retaining elongated projections 115 so as to be tapered, like a taper surface, radially outward, and therefore may be hindered from rotating. Thus, the retaining elongated projections 115 may become obstacles to smooth rotation of the roller 121.

The present invention has been made in view of the aforementioned circumstances and has an object to provide a cage for solving the problem that the rollers get caught by the roller retaining elongated projections.

Solution to Problem

For the purpose of solving the problem, a cage of a roller bearing according to the present invention includes a pair of rings and a plurality of pillars that couple the rings and extend in the axial direction so as to form pockets to accommodate the rollers. Each of the pillars includes a radially outer projection that is formed at the radially outer side of a pillar's wall surface facing a pocket so as to project in the circumference direction and restricts radially outward movement of a roller, and a radially inner projection that is formed at the radially inner side of the pillar's wall surface facing the pocket so as to project in the circumference direction and restricts radially inward movement of the roller. Allowable distance Lo to which the roller can move radially outward from a pitch circle of the rollers under the restriction of the radially outer projections and allowable distance Li to which the roller can move radially inward from the pitch circle of the rollers under the restriction of the radially inner projections satisfy the relationship $Lo>Li$.

According to the present invention, when the cage is in neutral position where the cage is concentric with a pitch circle of the rollers, the rollers abut on neither the radially outer projections nor radially inner projections. However, if the cage is moved off center from the neutral position, the rollers abut on the radially inner projections because the radially inward allowable distance Li of the rollers is shorter than the radially outward allowable distance Lo of the rollers. As a result, abutting between the rollers and the radially outer projections is avoided. Therefore, the rollers are not caught by the pairs of radially outer projections.

The allowable distance Li in which the rollers can move radially inward is determined by the distance from the pitch circle to the radially inner projections, the inclination angle between the wall surfaces of the pillars and the outer inclined surfaces of the radially inner projections, and the distance between the pair of the radially inner projections facing each other with a pocket therebetween. More specifically, the shorter the distance from the pitch circle to the radially inner projections, the greater the inclination angle between the wall surfaces of the pillars and outer inclined surfaces of the radially inner projections, and the shorter the distance between the pair of the radially inner projections, the shorter the radially inward allowable distance Li is.

Similarly, the allowable distance Lo in which the rollers can move radially outward is determined by the distance from the pitch circle to the radially outer projections, the inclination angle between the wall surfaces of the pillars and inner inclined surfaces of the radially outer projections, and the distance between the pair of the radially outer projections facing each other with a pocket therebetween. More specifically, the longer the distance from the pitch circle to the radially outer projections, the greater the inclination angle between the wall surfaces of the pillars and the inner inclined surfaces of the radially outer projections, and the shorter the distance between the pair of the radially outer projections, the shorter the radially outward allowable distance Lo is.

The cage is made of resin or metal. Preferably the cage is made of polyamide resin or iron-based metal. In order to facilitate forcible removal of the molding die for forming the pockets of the cage in a radially outward direction and to facilitate insertion of the rollers into the pockets of the cage, it is preferable to make the inner inclined surfaces of the radially outer projections relatively gradual. On the other hand, it is preferable to make the outer inclined surfaces of the radially inner projections relatively steep.

In an embodiment of the present invention, the distance Bo between the radially outer projections facing each other with a pocket interposed therebetween and the distance Bi between the radially inner projections facing each other with the pocket interposed therebetween preferably satisfy the relationship Bo>Bi. According to the embodiment, the relationship Lo>Li can be satisfied.

The shape of the radially outer projection and radially inner projection is not particularly limited. In the embodiment of the present invention, at least one of the radially outer projection and radially inner projection includes a plurality projections spaced in the axial direction of the cage. According to the embodiment, the arrangement of the projections formed with spaces in the axial direction allow lubricant of the roller bearing to pass through in between the axially neighboring projections to flow in the radius direction of the roller bearing. Therefore, the quantity of the lubricant flowing into the pockets can be increased. In another embodiment, the projection may be an elongated projection continuously extending in the axial direction.

The roller bearing structure according to the present invention includes the above-described cage, the rollers accommodated in the pockets of the cage, and a housing with an outer raceway on which the rollers roll. In addition, roller chamfer dimension Rr which is a radius of chamfers formed at axial ends of the rollers and housing chamfer dimension Rh which is a radius of a chamfer formed at an axial end of the outer raceway, satisfy the relationship Lo<Rr+Rh. According to the embodiment, even if the rollers shift radially outward from the pitch circle while the roller-and-cage assembly is mounted in the housing, the assembly operation can be smoothly performed.

In addition, the roller bearing structure of the present invention includes the above-described cage, the rollers accommodated in the pockets of the cage, and a shaft with an inner raceway on which the rollers roll. Roller chamfer dimension Rr of chamfers formed at axial ends of the rollers and shaft chamfer dimension Rs of a chamfer formed at an axial end of the inner raceway satisfy the relationship Li<Rr+Rs. According to the embodiment, even if the rollers shift radially inward from the pitch circle while the roller-and-cage assembly is mounted on the shaft, the assembly operation can be smoothly performed.

Advantageous Effects of Invention

As described above, the cage, which is used for retaining the rollers in the pockets so as to prevent the rollers from dropping out, of the present invention can prevent the rollers from being squeezed, like a wedge, in between the radially outer projections. Consequently, the rolling resistance of the rollers can be reduced and therefore the rotational resistance of the roller bearing can be also reduced.

DESCRIPTION OF EMBODIMENT

Figure 1:
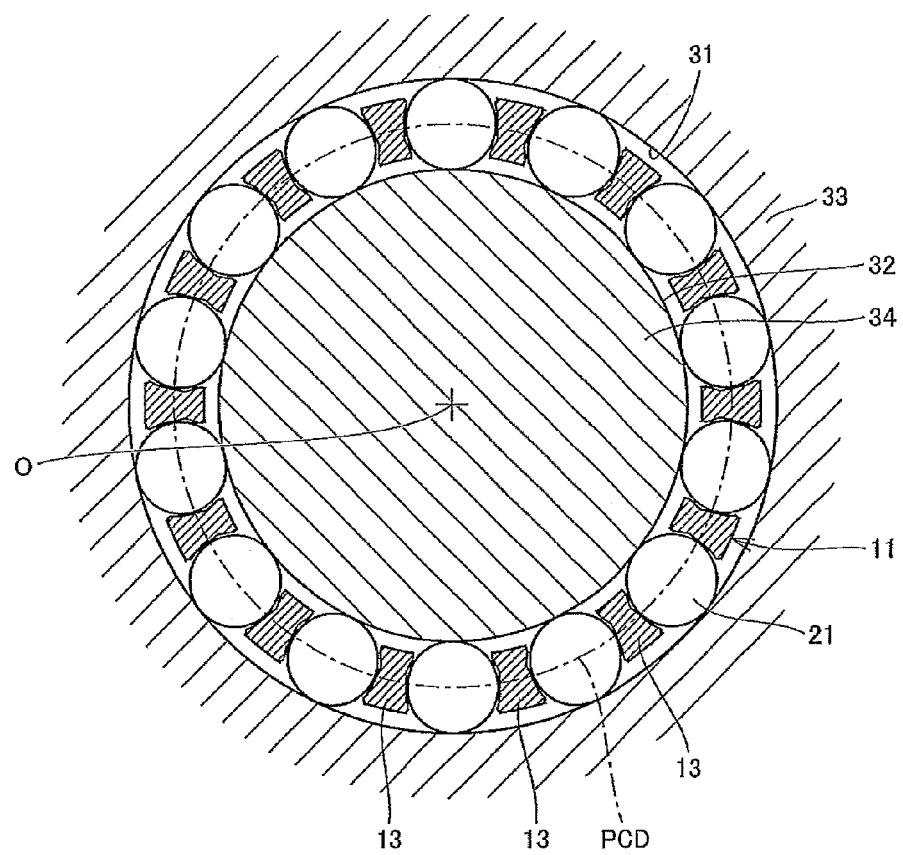
FIG. 1 is a transverse sectional view of a roller bearing structure according to an embodiment of the present invention.
Figure 2:
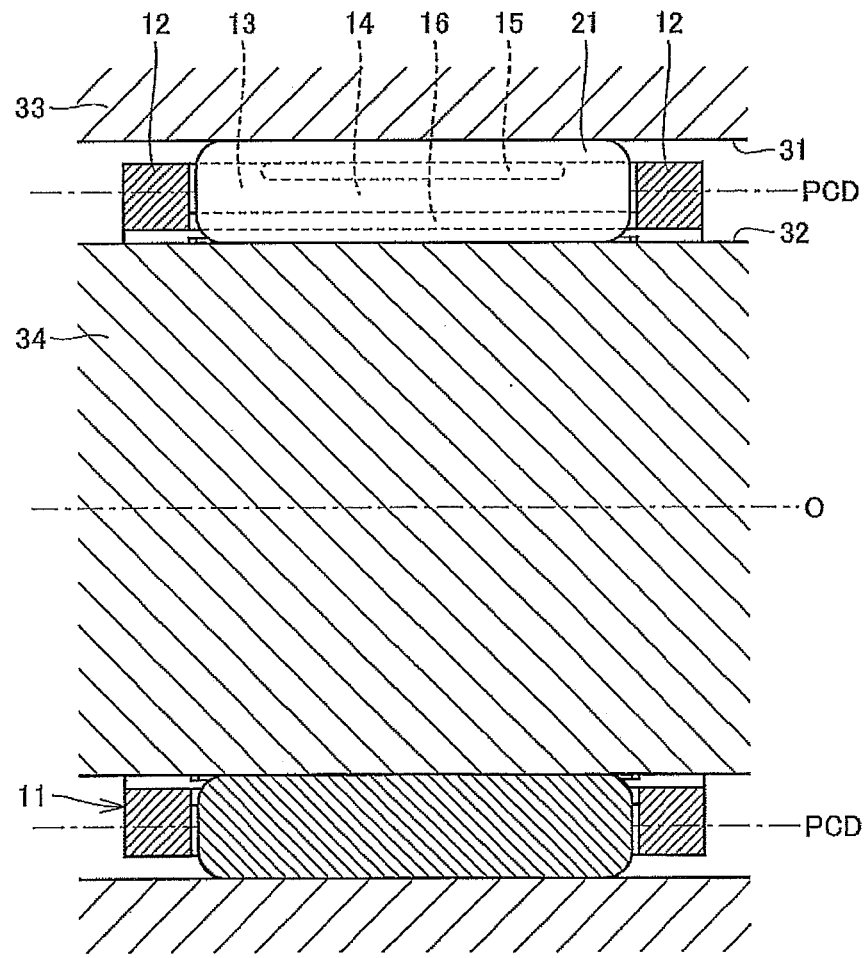
FIG. 2 is a vertical sectional view of the roller bearing structure according to the embodiment.
Figure 3:
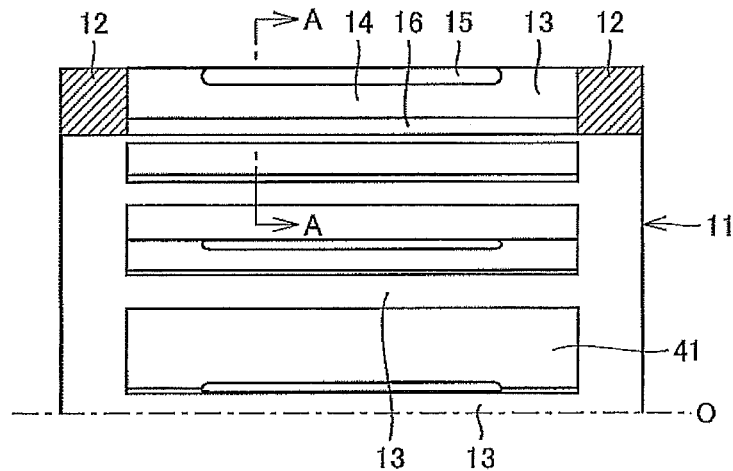
FIG. 3 is a vertical sectional view of a cage according to the embodiment.

With reference to the accompanying drawings, an embodiment of the present invention will be described below. FIG. 1 is a transverse sectional view showing a roller bearing structure according to an embodiment of the present invention and presents a cross section taken along a plane orthogonal to the axis of the roller bearing. FIG. 2 is a vertical sectional view showing the roller bearing structure according to the embodiment and presents a cross section taken along a plane containing the axis of the roller bearing. FIG. 3 is a vertical sectional view of a cage according to the embodiment and especially presents the upper half part of the cage with respect to the axis of the cage indicated by a dot-and-dash line. The roller bearing structure of this embodiment includes a cage 11, rollers 21, an outer raceway 31, and an inner raceway 32. The outer raceway 31 is an inner peripheral surface of a housing 33 and the inner raceway 32 is an outer peripheral surface of a shaft 34. The rollers 21 and cage 11 are placed in an annular space defined by the outer raceway 31 and inner raceway 32.

The rollers 21 are rolling elements, and more particularly are needle rollers that roll on the outer raceway 31 and inner raceway 32. The cage 11 retains the rollers 21 evenly spaced in the circumference direction. Thus, the housing 33 rotatably holds the shaft 34 with the plurality of rollers 21. If the outer raceway 31 and inner raceway 32 are not used, the cage 11 and rollers 21 form a roller-and-cage assembly because the cage 11 is designed to retain the rollers 21 to prevent the rollers 21 from dropping out.

When the axis of the cage 11 aligns with the axis of the shaft 34 as shown in FIG. 1, it is said that the cage 11 is in neutral position. The cage 11 in neutral position theoretically is concentric with the outer raceway 31 and inner raceway 32. In addition, the cage 11 in neutral position is concentric with a pitch circle PCD which is a theoretic circle formed by connecting the centers of the rollers 21 rolling on the outer raceway 31 and inner raceway 32.

The cage 11 is in a cylindrical shape and has a pair of rings 12, 12 arranged on one side and the other side of the cage 11 along the direction of axis O and a plurality of pillars 13 extending in the direction of the axis O and coupling the rings 12, 12. The pillars 13 are equidistantly arranged in the circumference direction and the neighboring pillars 13, 13 form pockets 41 for accommodating the rollers 21. Since the inner diameter of the cage 11 is greater than the outer diameter of the inner raceway 32 and the outer diameter of the cage 11 is smaller than the inner diameter of the outer raceway 31, the rolling surfaces of the rollers 21 project out from the inner peripheral surface and outer peripheral surface of the cage 11.

Figure 13:
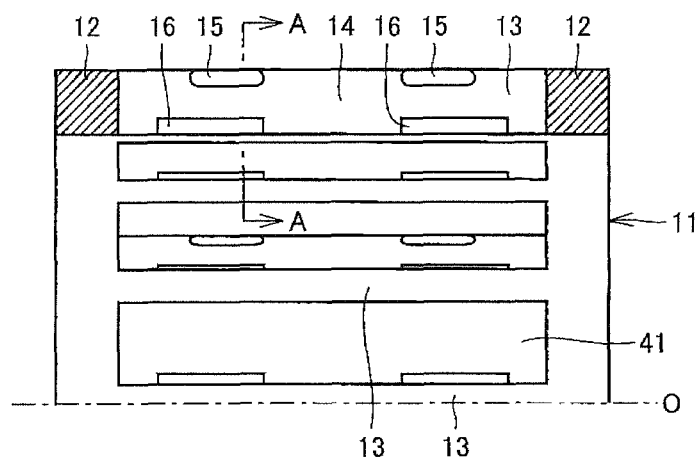
FIG. 13 is a vertical sectional view of another embodiment of the cage of FIG. 3.

The pillars 13 have wall surfaces 14 facing the pockets 41. The wall surfaces 14 face the rolling surfaces of the rollers 21 accommodated in the pockets 41 with adequate clearance therebetween. The wall surfaces 14 have radially outer projections 15 that are formed on the radially outer side and project in the circumference direction and radially inner projections 16 that are formed on the radially inner side and project in the circumference direction. As shown in FIG. 3, the radially outer projection 15 is an elongated projection formed in an axially center part of the pillar 13 so as to extend in the axial direction and has axial ends that are formed away from the rings 12. The radially inner projection 16 is an elongated projection extending in the axial direction and has axial ends that are connected to the rings 12, 12, respectively. FIG. 13 shows an alternative embodiment to the cage of FIG. 3, wherein a plurality of projections 15 and 16 are used.

Figure 4:
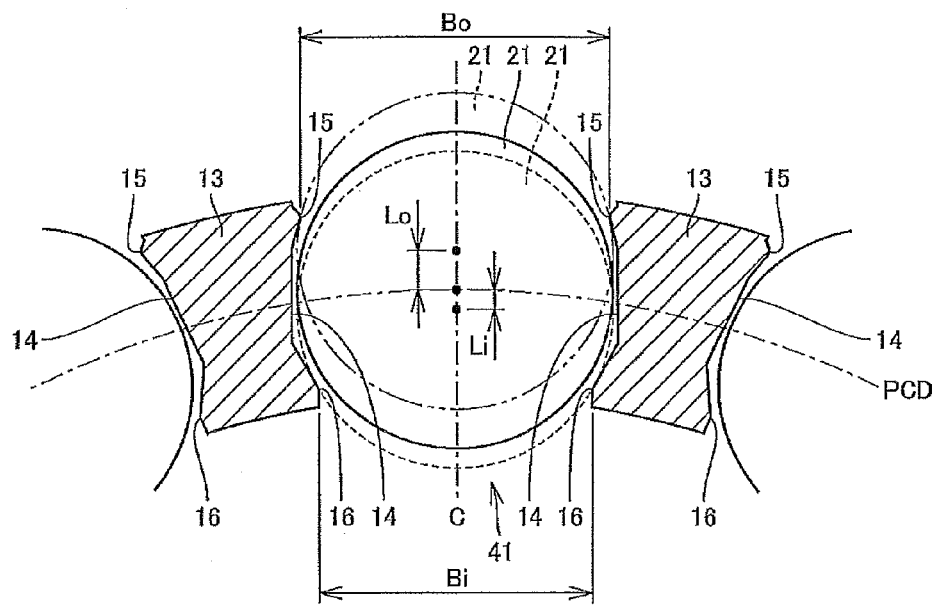
FIG. 4 is a transverse sectional view of a roller-and-cage assembly, illustrated on an enlarged scale, according to the embodiment.
Figure 5:
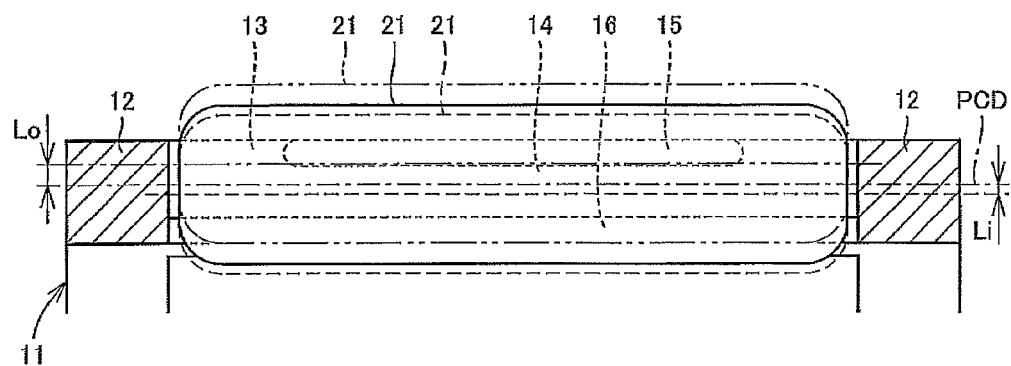
FIG. 5 is a vertical sectional view of the roller-and-cage assembly, illustrated on an enlarged scale, according to the embodiment.

FIG. 4 is a transverse sectional view of a roller-and-cage assembly, illustrated on an enlarged scale, according to the embodiment. The cross-section of the pillar 13 of FIG. 4 is taken along A-A of FIG. 3. FIG. 5 is a vertical sectional view of the roller-and-cage assembly, illustrated on an enlarged scale, according to the embodiment. A pair of the radially outer projections 15 facing each other with a pocket 41 therebetween are separated at a distance Bo that is shorter than the diameter of the roller 21, thereby preventing the roller 21 from dropping out radially outward. A pair of the radially inner projections 16 facing each other with the pocket 41 therebetween are separated at a distance Bi that is shorter than the diameter of the roller 21, thereby preventing the roller 21 from dropping out radially inward. Thus, the roller 21 is retained in the pocket 41.

The cage 11 in neutral position is concentric with a pitch circle PCD which is a theoretic circle formed by connecting the centers of the rollers 21 rolling on the outer raceway 31 and inner raceway 32. At this point, the roller 21 is present at a position indicated by a solid line in FIG. 4. At this position, the roller 21 shifts to neither the radially outer side nor the radially inner side of the cage, and the radially outer projections 15 and radially inner projections 16 face the rolling surface, which is the outer peripheral surface of the rollers 21, with clearance therebetween. The position of the roller 21 indicated by the solid line in FIG. 4 is defined as a reference position of the rollers 21 in the cage 11.

With respect to the cage 11, the roller 21 can move radially outward as indicated by a dashed double-dotted line in FIG. 4 from the reference position indicated by the solid line until the roller 21 abuts on the pair of the radially outer projections 15.

The maximum distance at which the roller 21 is allowed by the radially outer projections 15 to move is indicated by Lo from the predetermined pitch circle PCD. The roller 21 can also move radially inward as indicated by a dashed line in FIG. 4 from the reference position indicated by the solid line until the roller 21 abuts on the pair of the radially inner projections 16. The maximum distance at which the roller 21 is allowed by the radially inner projections 16 to move is indicated by Lo from the predetermined pitch circle PCD. In this embodiment, the allowable distance Lo and allowable distance Li satisfy the relationship Lo>Li.

Figure 6:
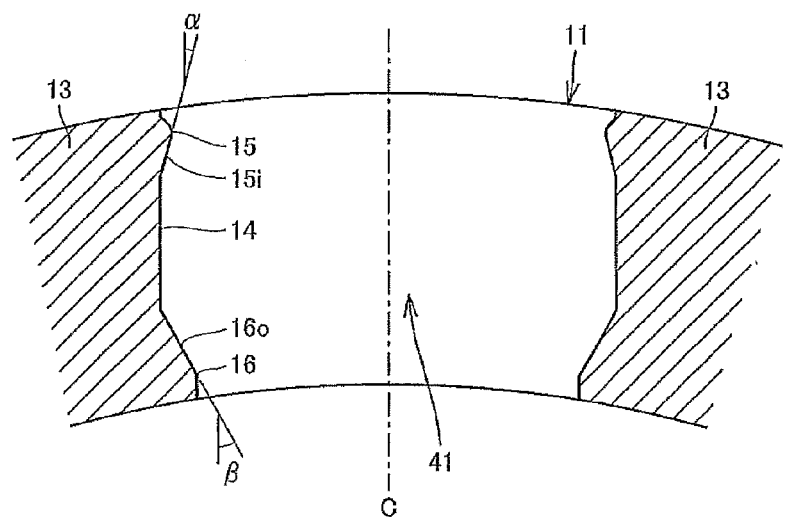
FIG. 6 is a transverse sectional view of the cage, illustrated on an enlarged scale, according to the embodiment.

FIG. 6 is a transverse sectional view of the cage, illustrated on an enlarged scale, according to the embodiment. The wall surface 14 is parallel with a reference plane C, which is an imaginary plane containing the axis O of the cage 11 and passing through the circumferentially center of the pocket 41. With respect to the reference plane C, the inclination angle $\alpha$ of an inclined surface 15$i$ on the radially inner side of the radially outer projection 15 is set to be gradual so as to facilitate forcible removal of a molding die from the cage 11 in a radially outward direction during molding formation of the cage 11 and to facilitate insertion of the rollers 21 from the radially outer side of the cage 11. On the other hand, the inclination angle $\beta$ of an inclined surface 16$o$ on the radially outer side of the radially inner projection 16 is set to be relatively steep with respect to the reference plane C. Therefore, the inclination angle $\alpha$ of the inclined surface 15$i$ and the inclination angle $\beta$ of the inclined surface 16$o$ satisfy $\alpha<\beta$. In other words, the taper angle formed by a pair of the inclined surfaces 16$o$ abutting on the roller 21 on the relatively radially inner side is set to be steeper than the taper angle formed by a pair of the inclined surfaces 15$i$ abutting on the roller 21 on the relatively radially outer side.

The functions of the roller bearing structure according to the embodiment will be described.

Figure 7:
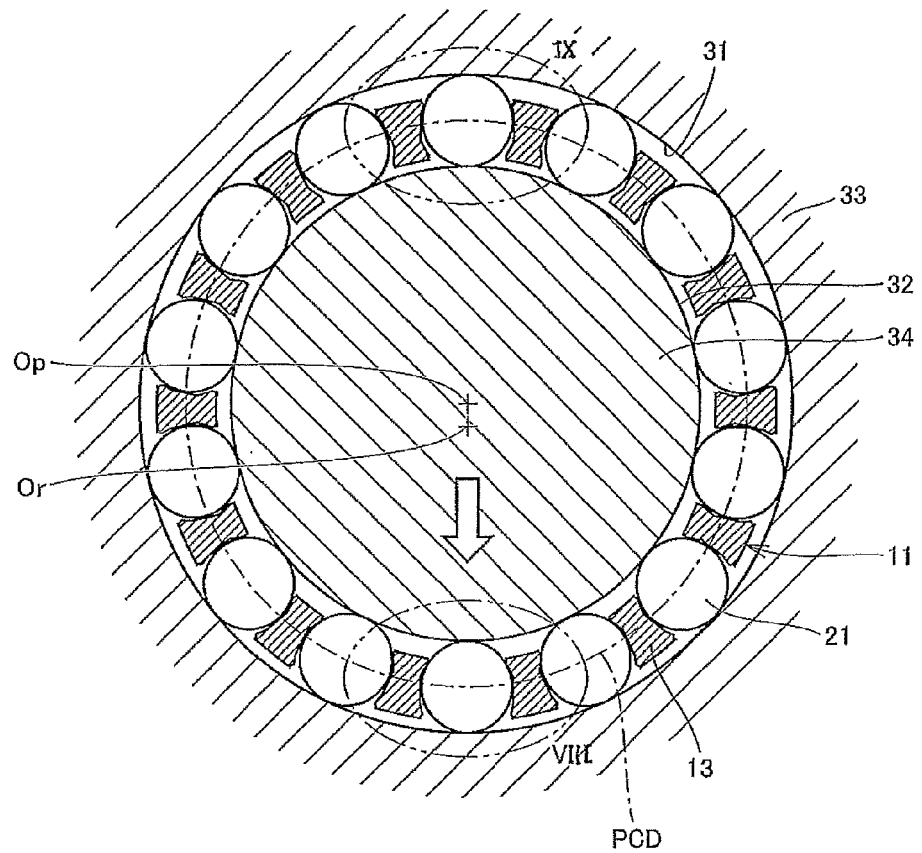
FIG. 7 is a transverse sectional view showing a state where the cage is moved off center from neutral position.
Figure 8:
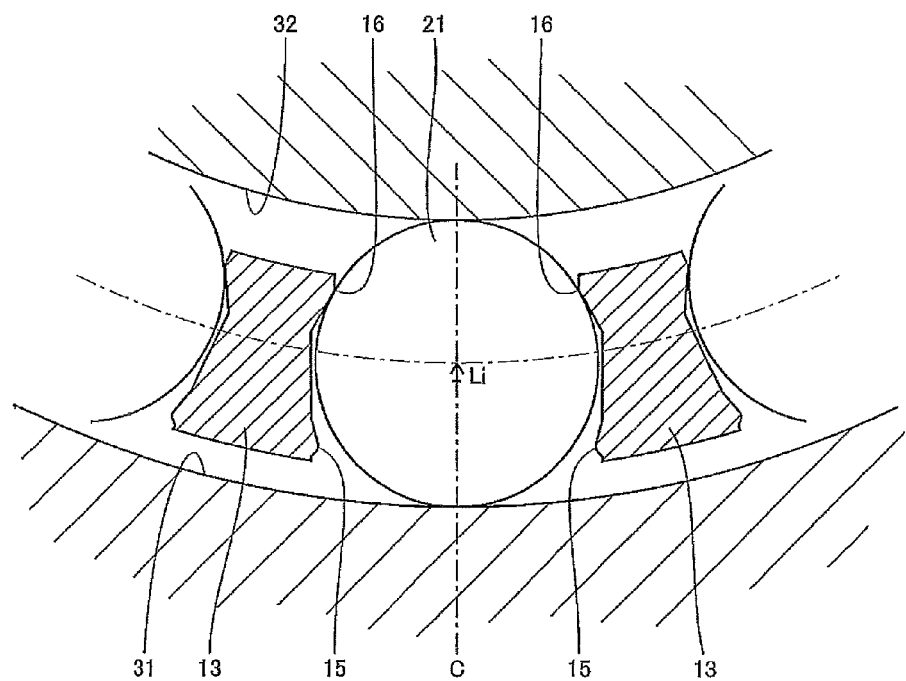
FIG. 8 is a transverse sectional view of a roller-and-cage assembly of FIG. 7, illustrated on an enlarged scale.
Figure 9:
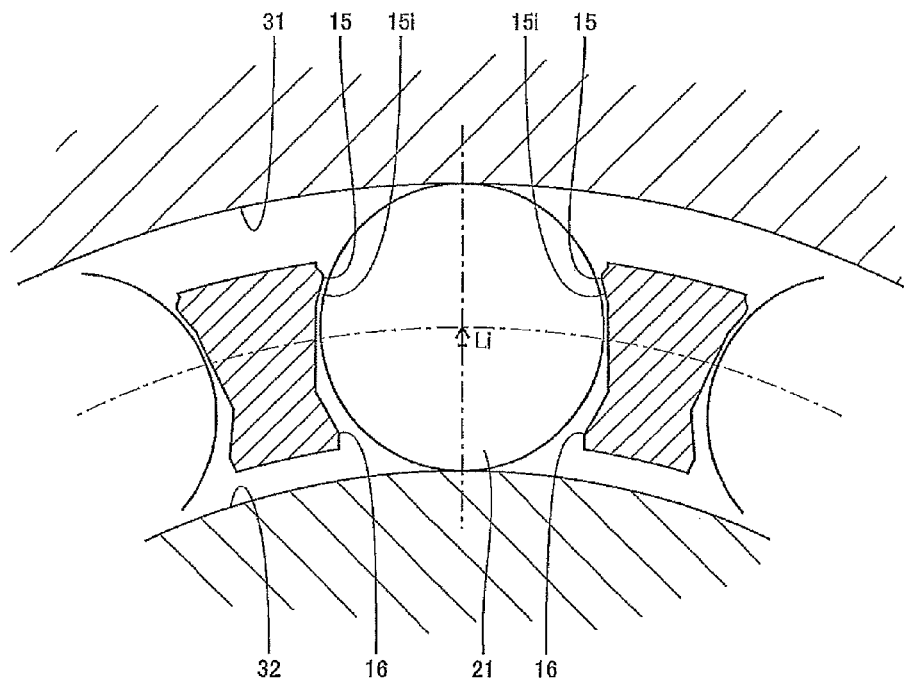
FIG. 9 is a transverse sectional view of the roller-and-cage assembly of FIG. 7, illustrated on an enlarged scale.

FIG. 7 is a transverse sectional view showing a state where the cage is moved off center from neutral position in the direction indicated by an arrow. FIG. 8 is a transverse sectional view of an enlarged part VIII of the roller-and-cage assembly, enclosed by a dashed double-dotted line in FIG. 7. FIG. 9 is a transverse sectional view of an enlarged part IX of the roller-and-cage assembly, enclosed by a dashed double-dotted line in FIG. 7. When only the cage 11 moves off center between the outer raceway 31 and inner raceway 32, the rollers 21 move in a radius direction relative to the cage 11. As shown in FIG. 7, when the cage 11 moves off center in the direction indicated by the arrow, the center Or of the cage 11 is displaced from the center Op of the pitch circle PCD. Then, the roller-and-cage assembly of the embodiment behaves as shown in FIGS. 7 to 9.

Specifically, as shown in FIG. 8, the roller 21 on the side to which the cage has moved off center moves radially inward from the reference position by Li and abuts on the radially inner projections 16. On the other hand, as shown in FIG. 9, the roller 21 on the opposite side to which the cage has moved off center moves radially outward from the reference position by Li. However, since the relationship, allowable distance Lo>allowable distance Li, is satisfied as described above, the roller 21 does not abut on the radially outer projections 15, and there is clearance between the rolling surface of the roller 21 and the radially outer projections 15.

According to this embodiment, since the relationship of allowable distance Lo>allowable distance Li is satisfied, the maximum distance at which the cage can move off center is limited to Li. Consequently, it can be prevented that the roller 21 is caught between the pair of inclined surfaces 15$i$ at a gradient tapered angle and therefore is squeezed, like a wedge, between the radially outer projections 15. It is therefore possible to reduce rolling resistance of the roller 21 and thereby to reduce rotational resistance of the roller bearing.

Assembly operation of the roller bearing structure according to the embodiment will be described.

Figure 10:
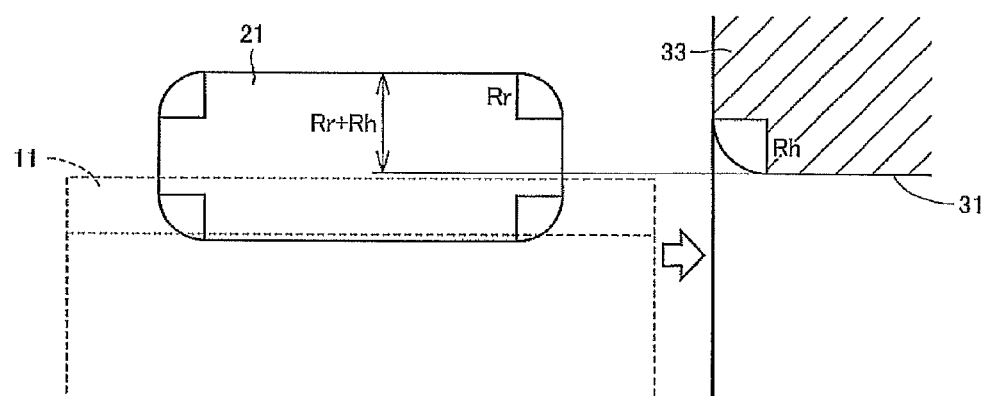
FIG. 10 is a transverse sectional view schematically showing the roller-and-cage assembly and a housing according to the embodiment.

In the first case, as shown in FIG. 10, the cage 11 of a roller-and-cage assembly and the outer raceway 31, which is an inner peripheral surface of the housing 33, are aligned so as to be concentric with each other, and an end surface of the cage 11 is arranged to face an end surface of the housing 33. Given that when the roller-and-cage assembly including the cage 11 and a plurality of the rollers 21 is inserted into the outer raceway 31 of the housing 33 in the direction indicated by an arrow to be mounted in the housing 33, the rollers 21 shift by allowable distance Lo from the reference position toward the radially outer side of the cage 11.

The axial opposite ends of the roller 21 are chamfered. These chamfers are formed at the corner between the rolling surface, which is the outer peripheral surface of the roller 21, and the end surfaces of the roller 21 to round the corner, and the radius of curvature of the rounded ends is radius Rr when viewed from the side of the roller 21. An axial end of the housing 33 is also chamfered. This chamfer is formed at the corner between the outer raceway 31, which is the inner peripheral surface of the housing 33, and an end surface of the housing 33 to round the corner, and the radius of curvature of the rounded end is radius Rh when viewed perpendicular to the axis of the roller bearing.

In this embodiment, the allowable distance Lo is set to be shorter than the sum of the radius Rr of the chamfers formed at the axial opposite ends of the roller 21 and radius Rh of the chamfer of the housing 33, formed at an axial end of the outer raceway 31 (Lo<Rr+Rh). According to the embodiment, even if the rollers 21 shift to the radially outer side of the cage 21 during the assembly operation of the roller-and-cage assembly into the housing 33, the chamfers of the rollers 21 abut on the chamfer of the housing 33, thereby guiding the rollers 21 to the outer raceway 31 of the housing 33. Thus, the assembly operation can be efficiently performed.

Figure 11:
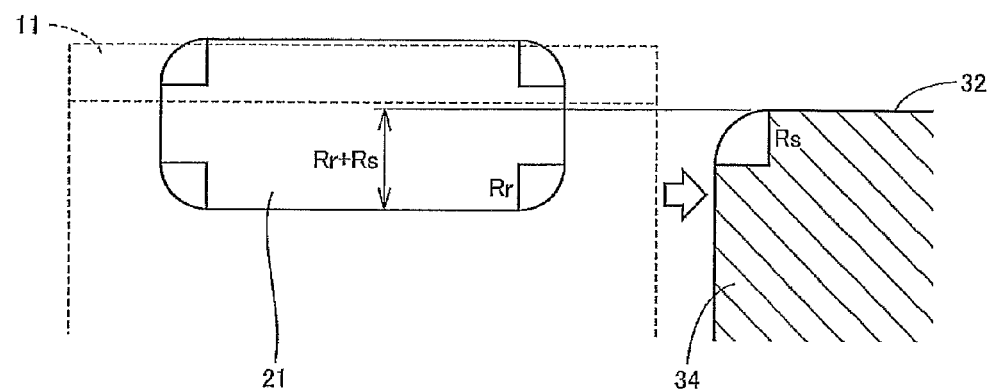
FIG. 11 is a transverse sectional view schematically showing the roller-and-cage assembly and a shaft according to the embodiment.
Figure 12:
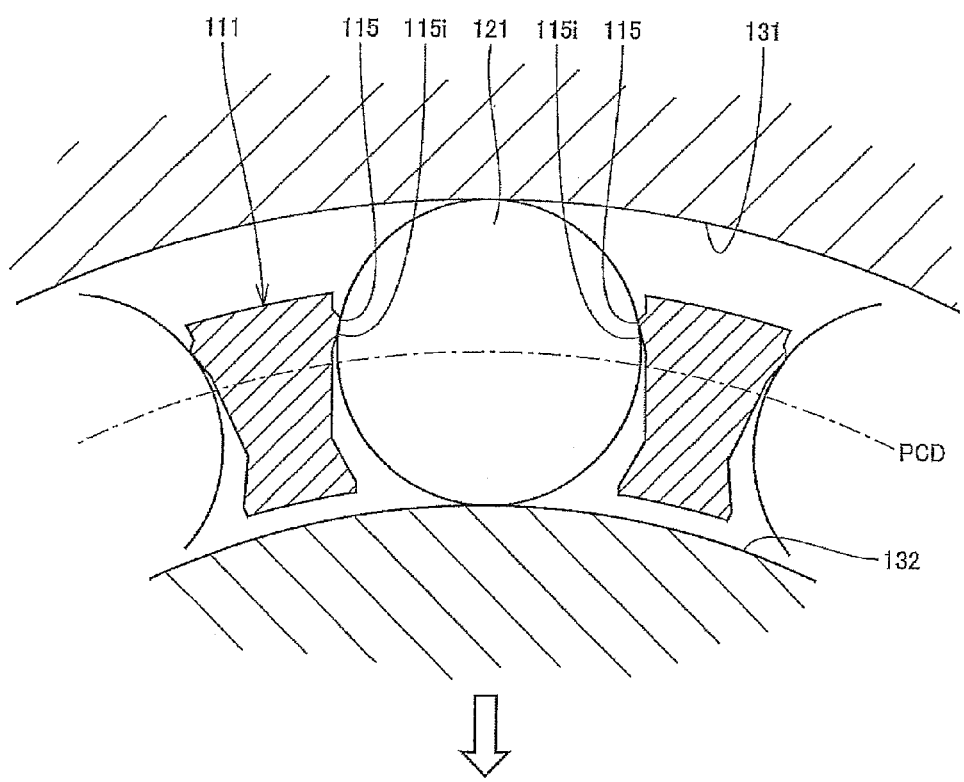
FIG. 12 is a transverse sectional view showing a typical roller bearing structure illustrated on an enlarged scale.

In the second case, as shown in FIG. 11, the cage 11 of the roller-and-cage assembly and the inner raceway 32, which is the outer peripheral surface of the shaft 34, are aligned so as to be concentric with each other, and one end surface of the cage 11 is arranged to face an end surface of the shaft 34. Given that when the roller-and-cage assembly including the cage 11 and a plurality of the rollers 21 is inserted into the inner raceway 32, which is the outer peripheral surface of the shaft 34, in the direction indicated by an arrow to be mounted on the shaft 34, the rollers 21 shift by allowable distance Li from the reference position toward the radially inner side of the cage 11.

An axial end of the shaft 34 is chamfered. This chamfer is formed at the corner between the inner raceway 32, which is the outer peripheral surface of the shaft 34, and an end surface of the shaft 34 to round the corner, and the radius of curvature of the rounded end is radius Rs when viewed perpendicular to the axis of the roller bearing.

In this embodiment, the allowable distance Li is set to be shorter than the sum of the radius Rr of the chamfers formed at the axial opposite ends of the roller 21 and radius Rs of the chamfer of the shaft 34, formed at an axial end of the inner raceway 32 (Li<Rr+Rs). According to the embodiment, even if the rollers 21 shift to the radially inner side of the cage 21 during the assembly operation of the roller-and-cage assembly onto the shift 34, the chamfers of the rollers 21 abut on the chamfer of the shaft 34, thereby guiding the rollers 21 to the inner raceway 32 of the shaft 34. Thus, the assembly operation can be efficiently performed.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

For example, the rollers 21 can be other types of rolling elements and, for example, can be cylindrical rollers. In addition, the radially outer projection 15 and radially inner projection 16 of this embodiment are elongated projections continuously extending along the axis O; however, although not illustrated, at least one of the radially outer projection 15 and radially inner projection 16 may include a plurality of projections spaced along the axis O of the cage 11.

INDUSTRIAL APPLICABILITY

The cage of the roller bearing according to the present invention is advantageously used in rolling-element bearings.

REFERENCE SIGNS LIST

11: cage; 12: ring; 13: pillar; 14: wall surface; 15: radially outer projection; 16: radially inner projection; 21: roller; 31: outer raceway; 32: inner raceway; 33: housing; 34: shaft; 41: pocket.

The invention claimed is:

1. A cage of a roller bearing comprising:
a pair of rings and a plurality of pillars that couple the rings and extend in the axial direction so as to form pockets to accommodate the rollers, wherein
each of the pillars includes a radially outer projection that is formed at the radially outer side of a pillar's wall surface facing a pocket so as to project in the circumference direction and restricts radially outward movement of a roller and a radially inner projection that is formed at the radially inner side of the pillar's wall surface facing the pocket so as to project in the circumference direction and restricts radially inward movement of the roller, and
allowable distance Lo to which the roller can move radially outward from a pitch circle of the rollers under the restriction of the radially outer projections and allowable distance Li to which the roller can move radially inward from the pitch circle of the rollers under the restriction of the radially inner projections satisfy the relationship Lo>Li,
wherein distance Bo between the radially outer projections facing each other with a pocket interposed therebetween and distance Bi between the radially inner projections facing each other with the pocket interposed therebetween satisfy the relationship Bo>Bi, and each radially outer projection arranged on the outer side of the cage is rounded as an arc shape in cross section, and the angle range of an inner inclined surface of each of the radially outer retaining elongated projections is within 15° to 25°.

2. The cage of a roller bearing according to claim 1, wherein
at least one of the radially outer projection and radially inner projection includes a plurality projections spaced in the axial direction of the cage.

3. A roller bearing structure comprising:
a cage according to claim 1; rollers accommodated in pockets; and a housing with an outer raceway on which the rollers roll, wherein
roller chamfer dimension Rr of chamfers formed at axial ends of the rollers and housing chamfer dimension Rh of a chamfer formed at an axial end of the outer raceway satisfy the relationship $Lo < Rr + Rh$.

4. A roller bearing structure comprising:
a cage according to claim 1; rollers accommodated in pockets; and a shaft with an inner raceway on which the rollers roll, wherein
roller chamfer dimension Rr of chamfers formed at axial ends of the rollers and shaft chamfer dimension Rs of a chamfer formed at an axial end of the inner raceway satisfy the relationship $Li < Rr + Rs$.

* * * * *